Sept. 1, 1964 B. W. MEYER 3,147,372
ARITHMETIC CIRCUITS
Filed Aug. 25, 1961 4 Sheets-Sheet 1

INVENTOR.
BURTIS W. MEYER
BY Samuel E. Turner
ATTORNEY

INVENTOR.
BURTIS W. MEYER
BY Samuel E. Turner
ATTORNEY

INVENTOR.
BURTIS W. MEYER
BY
Samuel E. Turner
ATTORNEY

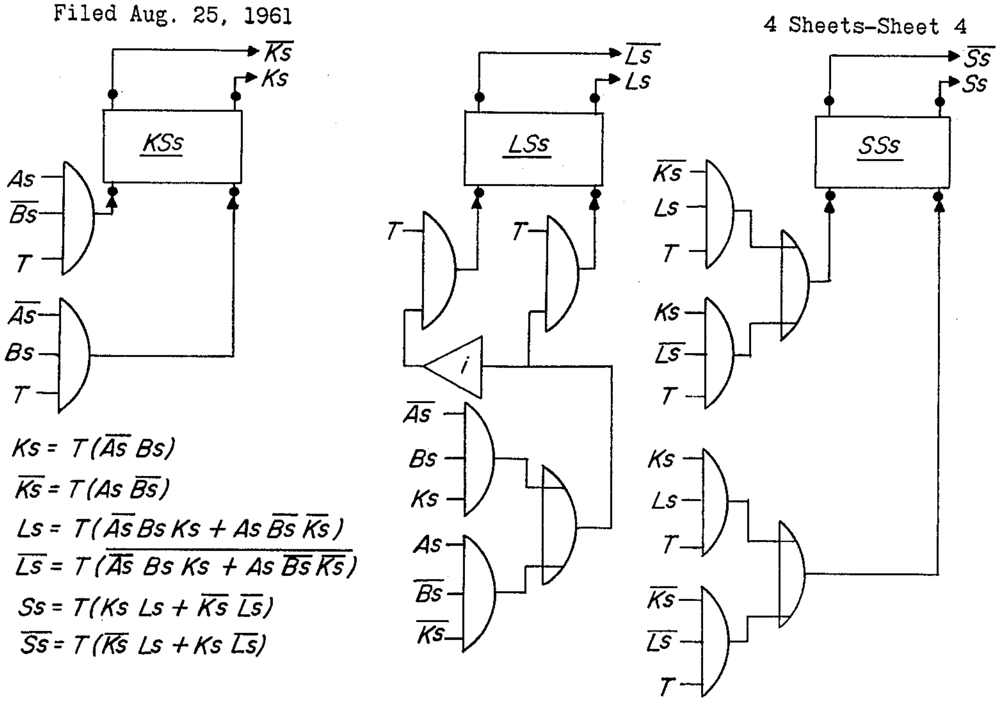
FIG. 5
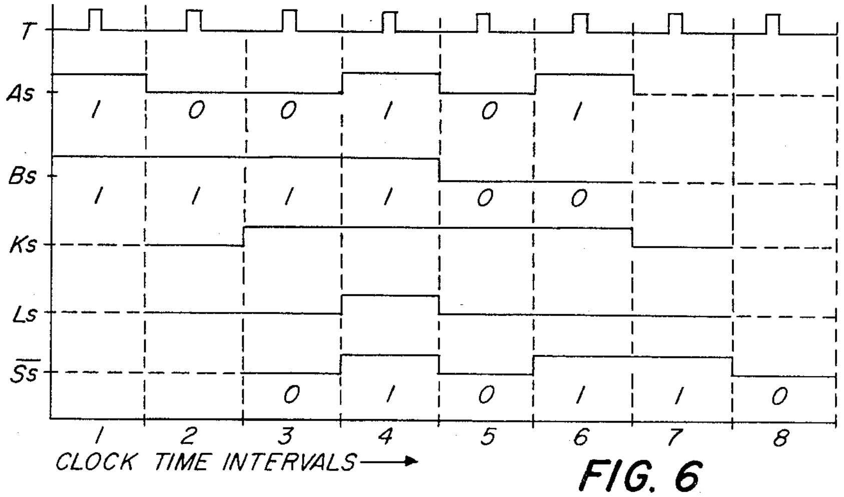
FIG. 6
$Cs = \underline{CSs}\,[T1(Xs + \overline{Ys}) + T2(\overline{X's} + Y's)]$
$Is = T2(\overline{X's}\;Y's\;C's + X's\;\overline{Y's}\;\overline{C's})$
$Zs = \underline{ZSs}\,[T1(Cs\,Is + \overline{Cs}\,\overline{Is}) + T2(C's\,\overline{I's} + \overline{C's}\,I's)]$
FIG. 7
INVENTOR.
BURTIS W. MEYER
BY Samuel E. Turner
ATTORNEY 3,147,372
ARITHMETIC CIRCUITS
Burtis W. Meyer, Palo Alto, Calif., assignor to General Electric Company, a corporation of New York
Filed Aug. 25, 1961, Ser. No. 134,003
11 Claims. (Cl. 235—176)

The invention relates to digital computing circuitry and particularly to serial binary arithmetic circuits. Though not limited thereto, the invention has especial utility in adder and subtracter circuits employing tunnel diode monostable circuits.

Binary adder circuits are known which employ two half adders in cascade. The first half-adder receives the augend and addend digits and produces the sum and carry terms for these digits. The second half adder combines this sum digit with the previous carry digit which has been stored.

Adder and subtracter circuits are also known which comprise rather extensive logic configurations for developing sum and carry terms or difference and borrow terms according to the well-known binary truth tables.

It is desirable to reduce the complexity of arithmetic circuits. It is also desirable to employ tunnel diodes as the active elements in adder and subtracter circuits to increase the speed of operation and to reduce the power consumption thereof.

It is therefore an object of the invention to provide improved serial binary adder and subtracter circuits.

Another object of the invention is to provide arithmetic circuits using a minimum of logic circuitry.

Another object of the invention is to form adder and subtracter circuits employing tunnel diodes.

These and other objects of the invention are achieved by providing information representing devices which are capable of producing signals representative of the binary digits "0" and "1." These devices are interconnected with logic circuitry to receive signals representative of the operand digits and to develop the sum or difference digit according to certain characteristics of the binary addition and subtraction truth tables as will be more fully understood from the following descriptions of illustrative embodiments of the invention with reference to the accompanying drawings wherein:

FIGURE 5 is a block diagram together with logic equations of one embodiment of a subtracter circuit;

FIGURE 6 is a timing diagram illustrating an example of operation of the circuit of FIG. 5; and FIGURE 7 illustrates a second embodiment of a subtracter circuit in logic equation form.

*Adder Circuits*

The well-known binary addition truth table is shown below:

| Augend A | Addend B | Previous Carry K | New Carry K′ | Sum S |
|---|---|---|---|---|
| 0 | 0 | 0 | 0 | 0 |
| 0 | 0 | 1 | 0 | 1 |
| 0 | 1 | 0 | 0 | 1 |
| 1 | 0 | 0 | 0 | 1 |
| 1 | 1 | 0 | 1 | 0 |
| 1 | 0 | 1 | 1 | 0 |
| 0 | 1 | 1 | 1 | 0 |
| 1 | 1 | 1 | 1 | 1 |

In this table A and B are the operand digits to be added. K is the previous carry digit from the addition of the next lower order terms. K′ is the new carry digit resulting from the addition of the A, B and K digits; and S is the sum digit.

The characteristics of this addition table employed by the present adder circuits are embodied in the following rules:

First, it may be seen that the carry digit changes only when the two operand digits A and B are the same. More specifically, when A and B are both "0" the new carry digit is "0." When A and B are both "1" the new carry digit is "1." However when A and B are not the same the new carry digit is the same as the previous carry digit.

Second, it may be seen that when the operand digits A and B and the previous carry digit K have the same value, "0" or "1," the sum digit S is the same as the new carry digit K′. This is the case of the top and bottom rows of the table. In all other cases the sum digit S is opposite in value to that of the new carry digit K′.

The structure of the present adder circuits, comprising the aforementioned information representing devices and interconnecting logic circuitry, takes advantage of these characteristics by responding to operand signals according to these characteristics to thereby manifest the sum digit and store the carry digit as will be more fully understood from the following descriptions of illustrative embodiments of the adder circuits of the present invention.

Figure 1:
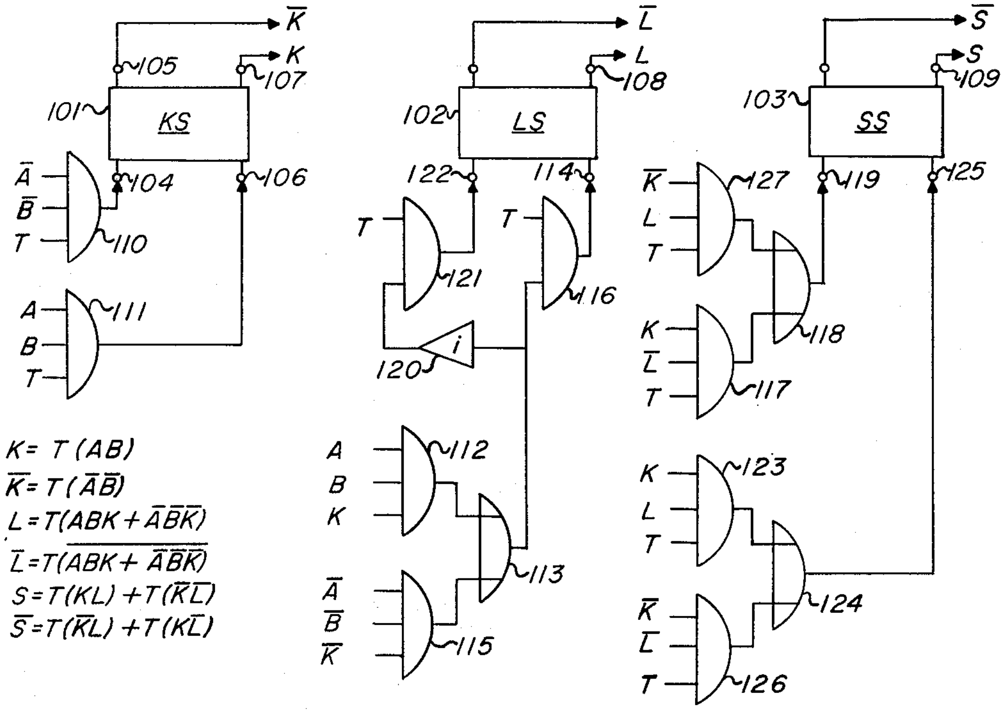
FIGURE 1 is a block diagram together with logic equations of one embodiment of an adder circuit of the invention.

Shown in FIG. 1 is an embodiment of an adder circuit of the invention comprising a structure which operates according to the above-discussed rules. This embodiment comprises three bistable information representing devices 101, 102 and 103 otherwise identified as a carry storage stage KS, an intermediate stage LS and a sum storage stage SS. The stages KS, LS and SS may be, for example, well-known bistable flip-flops. Such devices have two stable states of operation and are therefore capable of representing the binary digits "0" and "1." A bistable device assumes its reset or "0" representing state in response to a reset signal at its reset terminal, such as a reset terminal 104 of the KS stage. When the stage KS is in its reset state a relatively high level of voltage or an arming signal appears at a reset output terminal 105.

The stage KS assumes its set or "1" representing state in response to a set signal at a set input terminal 106 in which state a relatively high level of voltage or an arming signal appears at a set output terminal 107. The signal at the terminal 107 is identified as a set signal K while the signal at terminal 105 is identified as a reset signal $\overline{K}$. This indicates, according to well-known Boolean notation, that when the set signal K is at an arming level the reset signal $\overline{K}$ is at a disarming level and vice versa. The stages LS and SS are similar to stage KS and the foregoing description is equally applicable to them.

Gating circuits connected to the input terminals of the three stages receive clock pulses and operand signals and interconnect the stages. For clarity of the drawing, interconnecting leads have been omitted in FIG. 1 but the connections are clear from the signal designations at the input terminals of each gate and the output terminals of the stages.

Figure 2:
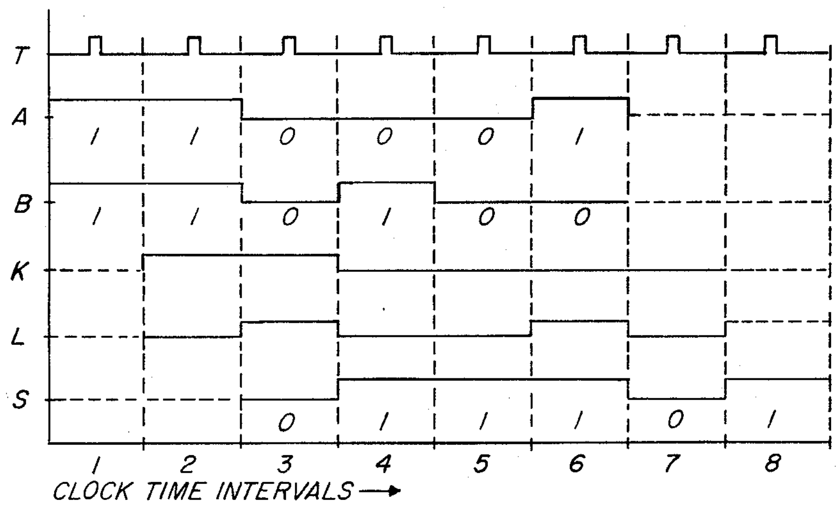
FIGURE 2 is a timing diagram of the signals involved in operation of the circuit of FIG. 1.

As an aid to understanding the operation of the circuit of FIG. 1 reference is made to the timing diagram of FIG. 2 which illustrates an example of the operation of adder circuit of FIG. 1. A signal T represents the clock pulses received from an external source (not shown) for the purpose of synchronizing the operation of the adder circuit with other parts of a computer system in well-known fashion. A pair of signals A and B represent the binary operands to be added. The operand signals are received from a storage source of well-known type (not shown) which applies the digit representing operand signals sequentially to the inputs of the adder circuit during successive clock time intervals.

The signal K is taken from the set output terminal 107 of stage KS as discussed hereinbefore. A signal L is similarly taken from a set output terminal 108 of the stage LS and a sum signal S is taken from a set output terminal 109 of the stage SS. When one of the set signals A, B, K, L or S is at a high or arming level during a clock time interval it is representative of a binary "1" during that interval. The reset signals $\overline{A}$, $\overline{B}$, $\overline{K}$, $\overline{L}$ and $\overline{S}$ are not shown in FIG. 2 since they are simply the opposites or complements of the signals A, B, K, L and S; that is, when A, for example, is at an arming level, $\overline{A}$ is at a disarming level and vice versa. Thus in FIG. 2, A is at an arming level during the interval 1 and it is therefore known that $\overline{A}$ is at a disarming level during this interval. The example illustrated by FIG. 2 will now be explained.

In the example of FIG. 2 the operand A is a binary number "100011" as indicated by the arming level of the signal during time intervals 1, 2 and 6 and the disarming level during time intervals 3, 4 and 5, it being noted that the digits occur lowest order first in time. To be added to A is the operand B which is a binary number "001011" as indicated by the arming level of the signal during time intervals 1, 2 and 4 and the disarming level during time intervals 3, 5 and 6. The sum of these operands is "101110" as indicated by the arming level of signal S during time intervals 4, 5, 6 and 8 and the disarming level during intervals 3 and 7, it being noted that the adder circuit of FIG. 1 results in a delay of two clock time intervals; for example, the sum resulting from the operand digits which are applied to the adder circuit during time interval 1 is not developed and represented by stage SS until time interval 3.

For purposes of illustration it is assumed that the circuit of FIG. 1 receives the operand digits order by order and lowest order first in time. It is also assumed that initially the stages KS, LS and SS are in their "0" states, that is, with signals K, L and S at a disarming level as shown in FIG. 2 by the dashed lines during interval 1.

The stage KS receives the operand signals A and B via its input gating circuit and assumes a state indicative of the carry digit according to the rules set forth hereinbefore; namely, if A and B are both "1" the stage KS is set and if A and B are both "0" the stage KS is reset. If A and B are not the same the stage KS remains in its previous state. The operand signals $\overline{A}$ and $\overline{B}$ are applied to the input terminals of an AND gate 110 the output terminal of which is connected to the reset terminal 104 of stage KS. (An AND gate is a well-known circuit which produces an output signal only when the signals applied to its input terminals are all at a high level.) From FIG. 2 it is seen that during the time interval 1, A and B are at an arming level and it thus follows that $\overline{A}$ and $\overline{B}$ are at a low or disarming level. Thus the gate 110 is disarmed when the clock pulse occurs during time interval 1 and therefore the gate 110 does not produce a reset signal.

The signals A and B are applied to an AND gate 111 connected to the set terminal 106. Since A and B are at an arming level during the time interval 1 the occurrence of the clock pulse in this interval causes a set signal to be applied to the set terminal 106 thus triggering the stage KS to its set or "1" representing state, which it assumes at the beginning of time interval 2 as indicated by the arming level of signal K during that interval. This is in accordance with the rule as set forth hereinbefore that if the operand digits of the current order are both "1" the new carry digit is a "1." (It is noted that a stage requires a certain amount of time to change state. Thus, as illustrated in FIG. 2, if a stage is triggered during a particular interval it will have completed its change of state and assumed its new state by the beginning of the next time interval.)

The intermediate sum stage LS receives operand signals and signals from the stage KS via its input gating circuit and in response thereto assumes a state indicative of whether or not the operand digits and the previous carry digit have the same value in accordance with the abovementioned rules, namely, that if the operand digits and the previous carry digit are of the same value the sum will be of the same value as the new carry digit. It is noted that the stage LS is triggered to indicate the relation among the operand digits and the previous carry digit during the same interval that stage KS is triggered to indicate the new carry digit. Thus stage LS is necessary as a storage of this relationship until the next interval when this information is used by the sum stage SS. Thus operand signals A and B are also applied to an AND gate 112 in the input circuit of intermediate stage LS. The signal K from the set output terminal 107 of stage KS is also applied to gate 112. Thus gate 112 produces an output signal only when signals A, B and K are at an arming level. During time interval 1, signals A and B are at an arming level; however, the signal K is at a disarming level during interval 1. Thus the gate 112 does not produce a signal at this time.

The signals $\overline{A}$, $\overline{B}$ and $\overline{K}$ are applied to an AND gate 115. Since the signals $\overline{A}$ and $\overline{B}$ are at a disarming level during time interval 1 the gate 115 likewise produces no output signal at this time and therefore the stage LS remains at its initial reset state during time interval 2.

The purpose of stage SS is to indicate the sum digit. It receives signals from stage KS indicative of the new carry digit and signals from stage LS indicative of the relationship among the operand digits and the previous carry digit. In accordance with the above described rules if the operand digits and the previous carry digit are of the same value (as indicated by the signal L from stage LS) the stage SS, in response to the signals K and $\overline{K}$, assumes the same state as the stage KS. In all other cases stage SS assumes a state opposite to the state of stage KS.

During time interval 2 the operand signals A and B are again at an arming level indicating the "1" value of the next to lowest order digits. Thus gate 111 applies a set pulse to the terminal 106 of stage KS upon the occurrence of the clock pulse during interval 2 and the stage KS remains in its set state during time interval 3.

Also during time interval 2 the signals A, B and K are at an arming level at the respective input terminals of gate 112. Thus the gate 112 produces an arming signal at its output terminal which is applied to an input terminal of an OR gate 113. (An OR gate is a well-known circuit which produces a high level or arming signal at its output terminal in response to a high level or arming signal at any one or more of its several input terminals; otherwise the signal at its output terminal is at a disarming level.) The output terminal of gate 113 is connected to an input terminal of an AND gate 116 the other input terminal of which receives the clock signal T. Thus during interval 2 the gate 116 is armed and upon the occurrence of the clock pulse the gate 116 applies a set signal to a set input terminal 114 of stage LS. Stage LS therefore assumes its set state resulting in an arming level of signal L during the interval 3.

During the interval 2 the signals K and $\overline{L}$ are at an arming level. These signals arm an AND gate 117 in the reset input circuit of stage SS. The output terminal of gate 117 is connected to an input terminal of an OR gate 118 which has its output terminal connected to a reset terminal 119 of the stage SS. Thus upon the occurrence of the clock pulse during interval 2 a reset signal is applied to the stage SS and it therefore remains in its reset state during the time interval 3 thus indicating the "0" value of the lowest order sum digit.

During time interval 3 the operand signals A and B are at a disarming level. Therefore signals $\overline{A}$ and $\overline{B}$ are at an arming level indicating the "0" value of the second from lowest order operand digits. The gate 110 is therefore armed upon the occurrence of the clock pulse of time interval 3 and stage KS is accordingly reset and assumes its "0" representing state during time interval 4 with signal K at a disarming level and $\overline{K}$ at an arming level.

Neither of the gates 112 or 115 is armed during time interval 3. This results in a disarming level of the signal at the output terminal of OR gate 113. The output terminal of gate 113 in addition to being connected to gate 116 is also connected to an input terminal of an inverter circuit 120. (An inverter is a well-known circuit which produces a high or arming level output signal in response to a low or disarming level input signal and a disarming level output signal in response to an arming level input signal.) Thus during interval 3 the inverter 120 responds to the disarming level from gate 113 to produce an arming signal at an input terminal of an AND gate 121 which has its output terminal connected to a reset terminal 122 of the stage LS. The other input terminal of gate 121 receives the clock signal T. Thus upon the occurrence of the clock pulse during interval 3 the gate 121 applies a reset signal to the reset terminal 122 and stage LS assumes its "0" representing state during interval 4 with the signal L at a disarming level and $\overline{L}$ at an arming level.

Also during time interval 3 the signals K and L applied to respective input terminals of an AND gate 123 are at an arming level. The gate 123 is connected through the agency of an OR gate 124 to a set input terminal 125 of the stage SS. Thus upon the occurrence of the clock pulse during the interval 3 a set pulse is applied to terminal 125 whereby the stage SS assumes its set state during the interval 4 thus indicating that the next to lowest order sum digit is a "1."

During time intervals 4 and 5 the signals K and L are at a disarming level and therefore signals $\overline{K}$ and $\overline{L}$ are at an arming level. The signals $\overline{K}$ and $\overline{L}$ are applied to an AND gate 126 which is also connected by means of gate 124 to the set terminal 125 of stage SS. Thus upon the occurrence of clock pulses during the intervals 4 and 5, set signals are applied to the stage SS and it remains in its set state during intervals 5 and 6 to indicate the "1" value of corresponding orders of the sum.

During time interval 6 the signal K is still at a disarming level, the signal L however is now at an arming level. Thus the signals $\overline{K}$ and L applied to an AND gate 127 in the reset input circuit of stage SS are at an arming level, resulting in a reset signal at the reset terminal 119 during time interval 6. Thus stage SS assumes its reset state during interval 7 to indicate that the next to highest order sum digit is a "0."

Additional details of the operation of the adder circuit of FIG. 1 are believed evident without further explanation it being noted that the logic equations or diagrams shown in FIG. 1 also define the structure for obtaining the sum of binary operands according to the invention.

Figure 3:
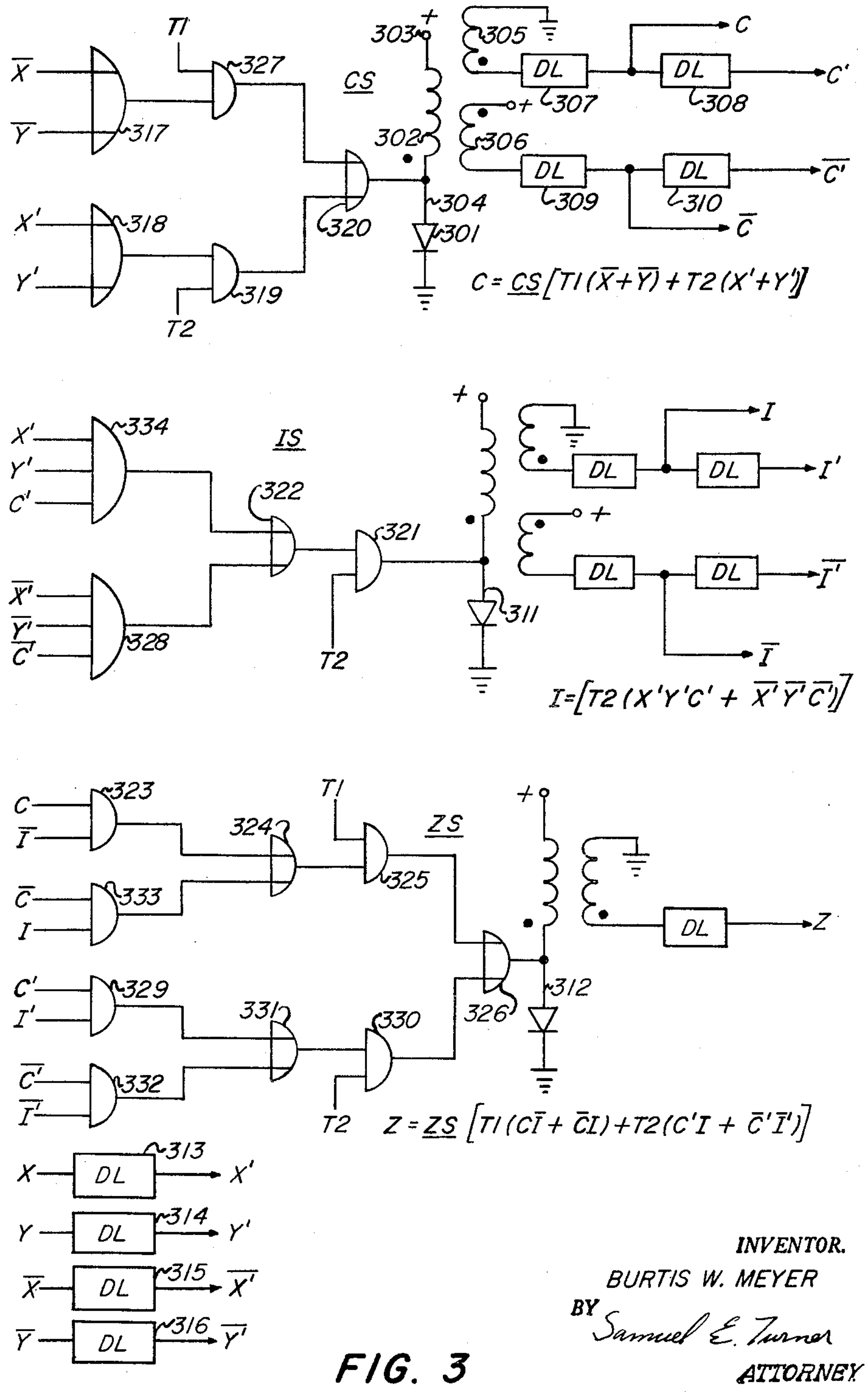
FIGURE 3 is a block diagram together with logic equations of a second embodiment of an adder circuit of the invention employing tunnel diode monostable devices.

Shown in FIG. 3 is an embodiment of an adder circuit of the invention which employs tunnel diode or other monostable circuits as information representing devices. Such monostable circuits and the manner of operation and control of them is fully described in a copending United States patent application Serial No. 118,346 of Burtis W. Meyer and Hardison J. Geer for an Information Storage Circuit, filed June 20, 1961, and assigned to the same assignee as the instant application to which reference is made for a more complete description.

It should be pointed out however that the manner of representing information is different in the present circuits than in the circuits shown in the aforementioned application Serial No. 118,346. In that application information is represented by the fact that an information representing monostable device is triggered on a corresponding phase of a multiphase clock signal thus producing output signals in coincidence with certain phases of the clock signal. In other words it is a time domain or time slot system of information representation.

In the binary adder circuit of FIG. 3 a two-phase clock pulse system is used for operation of the circuit. However, information is manifested by the condition of signals during a particular one of the clock phases.

The binary adder circuit of the embodiment of the invention shown in FIG. 3 comprises three stages; namely, a carry stage CS, an intermediate stage IS and a sum stage ZS. Each of these stages includes a similar tunnel diode monostable device. For example, the tunnel diode monostable device of the stage CS includes a tunnel diode 301 connected in series with a winding 302 and a voltage source connected to a terminal 303. The operation of such a tunnel diode monostable circuit is fully described in the aforementioned patent application Serial No. 118,346.

Briefly, the voltage applied to terminal 303 is such as to bias the tunnel diode at a point along the low-voltage positive resistance portion of its characteristic current-voltage curve. An input pulse applied to a junction 304 between the tunnel diode and the winding 302 switches operation into a region of negative resistance and triggers the circuit into an astable cycle of operation.

In the operation of the adder circuit of FIG. 3 it is necessary that the stages CS and ZS be inhibited from being triggered on successive phases of the clock pulses. This is accomplished by arranging the recovery time of the monostable circuit so that it overlaps the next following clock pulse and the circuit is therefore incapable of being triggered at that time. Other methods of inhibiting the triggering include feeding back an inhibiting pulse from the output circuit to the input circuit of the stage as is described in the aforementioned application Serial No. 118,346. The stage IS does not require this feature because only one phase of the clock pulse is applied to its input circuit.

An arrangement is provided for producing suitable output signals from each stage when its monostable circuit is triggered. For example, when stage CS is triggered to its astable state of operation a change in the current flow through the winding 302 occurs. This causes voltage pulses across a pair of windings 305 and 306 which are coupled to the winding 302. One end of the winding 305 is connected to ground or a point of reference potential. The other end of winding 305 is connected to the input terminal of a well-known delay circuit or delay line 307. The delay line 307 provides a set signal C which is normally at ground or a disarming level. The output terminal of delay line 307 is also connected to a delay line 308 which provides a delayed set signal C′ which is also normally at a disarming level.

By a similar arrangement of a pair of delay lines 309 and 310 connected to the winding 306, a reset signal $\overline{C}$ and a delayed reset signal $\overline{C}'$ are provided. However, one end of winding 306 is connected to a source of positive or arming potential and thus the signals $\overline{C}$ and $\overline{C}'$ are normally at an arming level. The windings 302, 305 and 306 are arranged in polarity, as indicated by the conventional polarity dots, such that when the stage is triggered a positive or arming pulse of the signals C and C′ and a negative or disarming pulse of the signals $\overline{C}$ and $\overline{C}'$ is produced.

Figure 4:
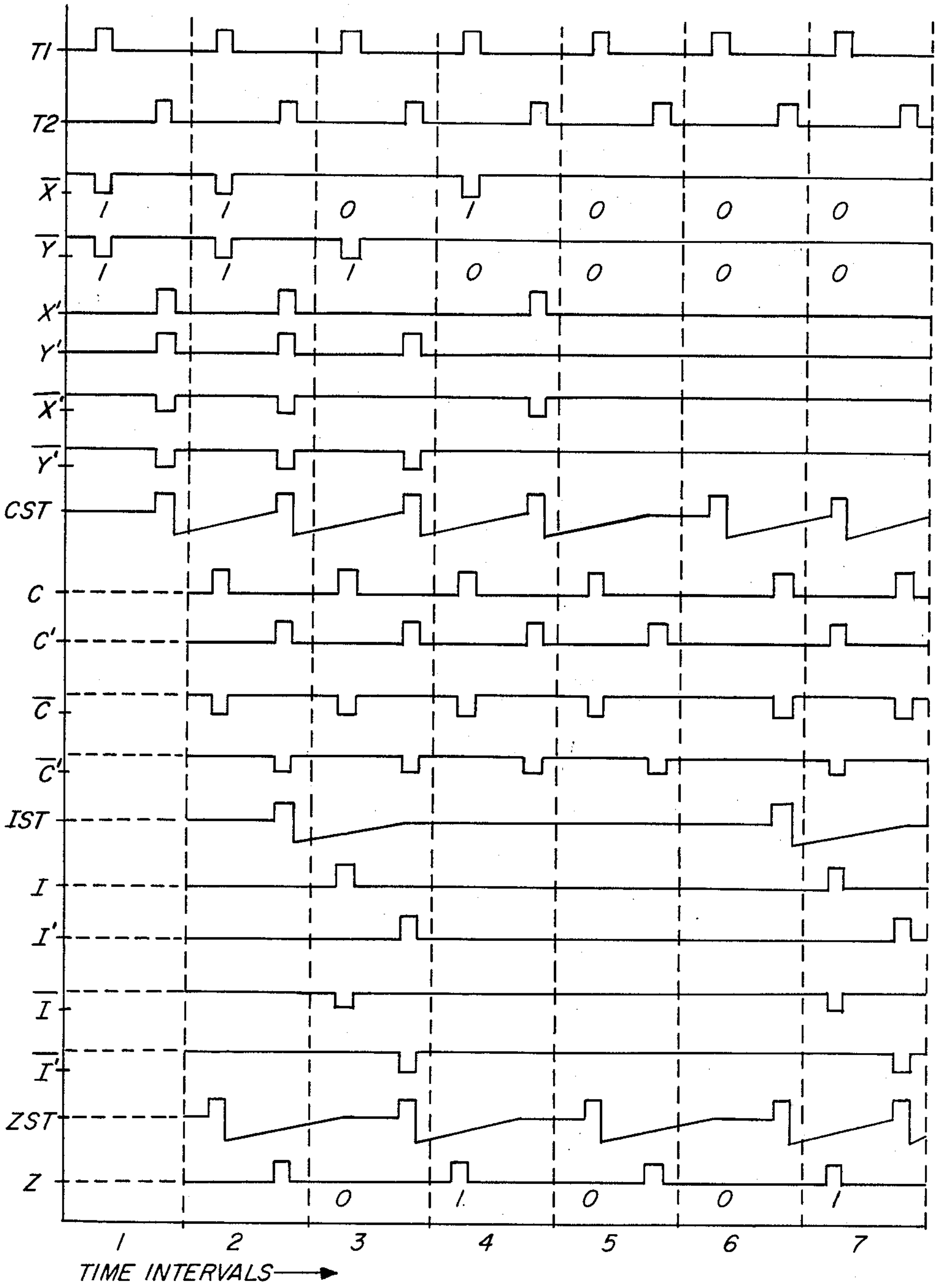
FIGURE 4 is a timing diagram illustrating the operation of the circuit of FIG. 3.

In order to see the relationship of the output signals from stage CS to the clock pulses and the other signals of the adder circuit it is appropriate at this point to refer to FIG. 4 which is a timing diagram of the operation of the adder circuit of FIG. 3 in the performance of an example addition of a pair of multiple order binary operands. In FIG. 4 there is shown a pair of clock pulse signal phases T1 and T2, a clock pulse of each phase occurring each time interval. (A two-phase clock pulse generator is shown in the aforementioned patent application Serial No. 118,346.) The signal CST is the signal at the junction 304 of stage CS and it illustrates the triggering of this stage. For example, the stage CS is triggered on the T2 clock pulse of time interval 1. The waveform of the CST signal is also drawn to illustrate that the stage CS is in an unrecovered condition during the occurrence of the clock pulse next following the one on which it is triggered.

As is seen from FIG. 4 the delay time of delay lines 307 and 309 (FIG. 3) is such as to bring the arming pulses of the set signal C and the disarming pulses of the reset signal $\overline{C}$ into coincidence with the first following clock pulse. Delay lines 308 and 310 further delay these pulses so that they occur as pulses of delayed set signal C′ and reset signal $\overline{C}'$ in coincidence with the second following clock pulse. For example, the triggering of stage CS on the occurrence of the T2 clock pulse of time interval 1 results in an arming pulse of signal C and a disarming pulse of signal $\overline{C}$ in coincidence with the T1 clock pulse of time interval 2 and an arming pulse of signal C′ and a disarming pulse of signal $\overline{C}'$ in coincidence with the T2 clock pulse of time interval 2.

The operation of stages IS and ZS is similar to that just described for stage CS. The stage IS provides a set output signal I and a delayed set signal I′, which are normally at a disarming level, and a reset signal $\overline{I}$ and a delayed reset signal $\overline{I}'$ which are normally at an arming level. The stage ZS provides a set output signal Z.

A signal IST, shown in FIG. 4, represents the signal at a junction 311 of the stage IS and indicates the triggering of this stage. A signal ZST represents the signal at a junction 312 of the stage ZS and indicates the triggering of this stage.

The multiple order binary operands to be added are received (from apparatus not shown) serially, that is, order by order, lowest order first, and they are in the form of set signals normally at a disarming level and reset signals normally at an arming level. Thus the first operand is represented by a set signal X and a reset signal $\overline{X}$ and the second operand by a set signal Y and a reset signal $\overline{Y}$. A binary digit "1" of an operand is represented by complementary arming and disarming pulses of the set and reset signals respectively in coincidence with the clock pulses of the T1 phase. A binary digit "0" is represented by the absence of such pulses at the occurrence of T1 pulses. The reset operand signals $\overline{X}$ and $\overline{Y}$ representing the example operands are shown in FIG. 4 together with a designation of the binary value at each T1 pulse, the lowest order digit occurring during time interval 1.

For operation of the adder circuit of FIG. 3 delayed operand set and reset signals are required. These may be obtained by applying the operand signals X, Y, $\overline{X}$, and $\overline{Y}$ to a group of delay lines 313–316 as shown in FIG. 3. In this way a pair of delayed operand set signals designated X′ and Y′, and a pair of delayed operand reset signals $\overline{X}'$ and $\overline{Y}'$ are obtained. These signals are shown in FIG. 4 for the example operands.

For clarity of the drawing, interconnecting leads from the delay lines 313–316 and among the stages CS, IS and ZS have been omitted in FIG. 3, the connections being clear from the signal designations at each input and output lead.

Each of the stages CS, IS and ZS includes an input logic gating circuit for receiving signals and for triggering the stages to produce output signals according to the aforementioned rules of binary addition according to the invention. It will be recalled that according to these rules if the digits of corresponding orders of the operands are both "0" the new carry digit is "0," if they are both "1" the new carry digit is "1" and if the operand digits are of unlike value the new carry digit has the same value as the previous carry digit. The carry stage CS receives operand reset signals $\overline{X}$ and $\overline{Y}$ and delayed set signals X′ and Y′ and produces output signals according to this relationship.

It will also be recalled that if the operand digits and the previous carry digit are of like value the sum of these digits has the same value as the new carry digit, and in all other cases the sum is opposite in value to the new carry digit. The intermediate stage IS receives delayed operand and carry set and reset signals and produces output signals indicative of their equality of value. The sum stage ZS receives signals from the carry stage CS and the intermediate stage IS for developing the sum signal Z according to the above relationship.

The input logic gating circuitry of the adder circuit of FIG. 3 is defined by a respective logic equation which is shown with each stage. It is to be noted that the terms CS and ZS in the equations of the CS and ZS stages relate to the inhibiting feature of the stages and indicate that a stage will not be triggered on a given clock pulse if it was triggered on the last clock pulse.

Further explanation of the binary adder of FIG. 3 will be given in connection with the example addition illustrated by the timing diagram of FIG. 4. Three things should be kept in mind. First, the operand digits appear lowest order first in time and, therefore, the sum digits are developed lowest order first. Second, the circuit introduces a delay of two time intervals. Third the T1 phase is the value indicating phase, that is, a pulse in coincidence with a T1 pulse is indicative of a binary "1" value. The absence of a pulse at this time is indicative of a binary "0" value. Pulses occurring in coincidence with the pulses of the T2 phase have no direct value indicating significance.

As shown in FIG. 4 a binary number or operand "0111," represented by the reset signal $\overline{Y}$ is to be added to a binary operand 1011, represented by the reset signal $\overline{X}$. The sum of these operands is "10010" represented by the signal Z during time intervals 3–7.

Disarming pulses of the operand reset signals $\overline{X}$ and $\overline{Y}$ thus occur during time interval 1 in coincidence with the T1 pulse as representative of the lowest order digits of the operands. These pulses are applied to the input terminals of a well-known OR gate 317 in the input circuit of stage CS and inhibit its triggering on the T1 clock pulse of interval 1.

The set signals X and Y (not shown in FIG. 4) are applied to the delay lines 313 and 314 as previously mentioned. Arming pulses of the delayed operand signals X′ and Y′ therefore occur in coincidence with the T2 pulse of interval 1. The signals X′ and Y′ are applied to the input terminals of an OR gate 318 in the input circuit of stage CS. The output terminal of gate 318 is connected to an input terminal of an AND gate 319 which has the T2 phase of clock pulses applied to its other input terminal. Thus upon the occurrence of the T2 clock pulse of interval 1, the gate 319 produces a signal which, through an OR gate 320, triggers the monostable circuit of the stage CS. The triggering of stage CS at this time results in an arming pulse of set signal C and a complementary disarming pulse of reset signal $\overline{C}$ in coincidence with the T1 pulse of time interval 2 thus indicating that the carry digit from the lowest order operand digits is a "1."

During time interval 2 disarming pulses of the operand reset signals $\overline{X}$ and $\overline{Y}$ again occur in coincidence with the P1 pulse of this interval to inhibit the triggering of stage CS. Also, arming pulses of the delayed set signals X′ and Y′ occur in coincidence with the P2 pulse of interval 2 thus resulting in the triggering of stage CS at this time as indicated by the signal CST.

The delayed operand set signals X′ and Y′ and the delayed set output signal C′ from the stage CS are applied to the input terminals of an AND gate 334 in the input circuit of intermediate stage IS. The arming pulses of these signals, which occur during interval 2, arm an AND gate 321 through an OR gate 322. Thus upon the occurrence of the T2 pulse of interval 2 the gate 321 produces an output signal which triggers the monostable circuit of stage IS as indicated in FIG. 4 by the signal IST.

The triggering of stage IS results in arming pulses of the set and delayed set signals I and I′ and disarming pulses of the reset and delayed reset signals $\overline{I}$ and $\overline{I}'$ during time interval 3.

The arming pulses of the set signal C and the reset signal $\overline{I}$ which occur during interval 2 in coincidence with the T1 pulse results in the triggering of the monostable circuit of the sum stage ZS through the input gating arrangement of this stage comprising an AND gate 323, an OR gate 324, an AND gate 325 and an OR gate 326, the latter having its output terminal connected to the junction 312. This triggering of stage ZS results in an arming pulse of the sum signal Z in coincidence with the T2 pulse of interval 2. However, as hereinbefore mentioned the pulse of the sum signal Z in coincidence with the T2 phase has no value representing significance and the signal Z is at a disarming level upon the occurrence of the T1 pulse in interval 3 to thereby indicate that the lowest order sum digit is a "0."

During time interval 3 the reset signal $\overline{X}$ applied to gate 317 is at an arming level. Thus an AND gate 327 in the input circuit of stage CS is armed upon the occurrence of the T1 pulse of this interval. However, stage CS is still in an unrecovered state, as indicated by signal CST, so that it does not respond to the resulting triggering pulse. By the time of occurrence of the T2 pulse of interval 3 the stage CS has recovered and the concurrence of an arming level of signal Y′ and the T2 pulse at this time results in the triggering of the stage. An arming pulse of the set signal C is thereby produced in coincidence with the T1 pulse of interval 4. This is in accordance with the rule set forth hereinbefore that if the operand digits are of different value (as in interval 3) the new carry digit is the same as the previous carry digit.

During time intervals 3, 4 and 5 the logic conditions for triggering the stage IS are not met, one or more of the signals X′, Y′ and C′ applied to the AND gate 334 and the signals $\overline{X}'$, $\overline{Y}'$ and $\overline{C}'$ applied to an AND gate 328 being at a disarming level upon the occurrence of the T2 pulses.

The stage ZS is triggered on the T2 pulse of the interval 3 in response to the arming pulses of the delayed set signals C′ and I′ which are applied to an AND gate 329 and by which an AND gate 330 is armed through an OR gate 331. The triggering of stage ZS at this time results in an arming pulse of the sum signal Z in coincidence with the T1 pulse of interval 4 thus indicating that the sum of the second from lowest order operand and carry digits is a "1."

Further details of the operation of the adder circuit of FIG. 3 are believed evident from the timing diagram of FIG. 4 without additional description with the exception that it is noted that the signals $\overline{C}'$ and $\overline{I}'$, applied to an AND gate 332, result in a triggering of stage ZS on the T2 pulse of interval 6. Thus the stage ZS is in an unrecovered condition upon the occurrence of the T1 pulse of the interval 7. The stage ZS therefore is not triggered at that time in response to the arming pulse of signal I and the arming level of signal $\overline{C}$ which appears on the input terminals of an AND gate 333 at that time.

*Subtracter Circuits*

The well-known binary subtraction truth table is shown below:

| Minuend As | Subtrahend Bs | Previous Borrow Ks | New Borrow K′s | Difference Ss |
|---|---|---|---|---|
| 0 | 0 | 0 | 0 | 0 |
| 0 | 0 | 1 | 1 | 1 |
| 0 | 1 | 0 | 1 | 1 |
| 0 | 1 | 1 | 1 | 0 |
| 1 | 0 | 0 | 0 | 1 |
| 1 | 0 | 1 | 0 | 0 |
| 1 | 1 | 0 | 0 | 0 |
| 1 | 1 | 1 | 1 | 1 |

In this table A*s* is the minuend digit from which the subtrahend digit B*s* is to be subtracted. K*s* is the previous borrow digit from next lower order terms. K′*s* is the new borrow digit resulting from the subtractive combination of the A*s*, B*s*, and K*s* digits; and S*s* is the difference digit of the current order.

The characteristics of this subtraction table employed by the present subtracter circuits are embodied in the following rules:

First, when the minuend digit is "0" and the subtrahend digit "1," the new borrow digit is "1." When the minuend digit is "1" and the subtrahend digit is "0," the new borrow digit is "0." In all other cases the new borrow digit is the same as the previous borrow digit.

Second, when the minuend digit is "0" and the subtrahend and the previous borrow digits are both "1," the difference digit is "0." When the minuend digit is "1" and the subtrahend and previous borrow digits are both "0," the difference digit is "1." In all other cases the difference digit is the same as the new borrow digit.

An embodiment of a subtracter circuit which is operable to receive and determine the difference between two multiple order binary operands according to the foregoing rules is shown in FIG. 5 in block diagram and logic equation form.

It will be noted that the subtracter circuit of FIG. 5 is similar to the adder circuit of FIG. 1 and in fact the same elements of structure may be employed, the differences in the circuit structure being in the connections for receiving the minuend signals and the output connection for delivering the difference signal. Because of this similarity, the signal designations and the designations of the stages of FIG. 1 are employed in FIG. 5 with a lower-case "*s*" added.

Thus in FIG. 5 the minuend signals are designated A*s* and $\overline{As}$, the subtrahend signals B*s* and $\overline{Bs}$, the borrow signals from a borrow stage K*ss* are designated K*s* and $\overline{Ks}$. The intermediate signals from an intermediate stage L*ss* are designated L*s* and $\overline{Ls}$ and the difference is manifested by a signal $\overline{Ss}$ from a difference stage SS*s*.

While the circuit of FIG. 5 performs subtraction according to the subtraction rules set forth above, the circuit may also be considered as performing subtraction by the well-known method of complementing the minuend, adding the complemented minuend to the subtrahend and complementing the resulting sum to obtain the difference. This may be seen by observing that where the set operand signal A is applied in FIG. 1 the reset minuend signal $\overline{As}$ is applied in FIG. 5 and where the reset operand signal $\overline{A}$ is applied in FIG. 1, the set minuend signal $As$ is applied in FIG. 5. Also the difference is manifested by the reset signal $\overline{Ss}$ which is, of course, the complement of the signal $Ss$.

An example of the operation of the subtracter circuit of FIG. 5 is shown by the timing diagram of FIG. 6. In view of this timing diagram and the detailed description of the circuit of FIG. 1 given hereinbefore the operation of the subtracter circuit of FIG. 5 is believed evident without further elaboration. It is pointed out, however, that if it should be desirable that the set signal $Ss$ manifest the difference, this may be accomplished by connecting the gating circuits in the input of stage $SSs$ for receiving borrow and intermediate signals according to the following logic equations:

$$\overline{Ss}=T(KsLs+\overline{Ks}\,\overline{Ls}):Ss+T(\overline{Ks}Ls+Ks\overline{Ls})$$

A second embodiment of a subtracter circuit may be formed of tunnel diode or other monostable devices such as discussed in connection with the adder circuit of FIG. 3. Shown in FIG. 7 are logic equations which define a modification of the structure of FIG. 3 for performing subtraction. Again the same signal designations are used with a lower-case "*s*" added to each term for distinction. In view of the logic equations of FIG. 7 and the foregoing detailed description of FIG. 3 the modifications for forming a subtracter structure are believed evident without further elaboration.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A system for additively combining a pair of multiple order binary operands, comprising: first, second and third binary information representing devices each having a binary digit "0" and a binary digit "1" representing condition; input means connected to said second device for receiving simultaneous signals representative of the digits of corresponding orders of said operands and for receiving signals indicative of the information representing condition of said first device and operable to cause said second device to assume its "1" representing condition when the digits of said corresponding orders are both "1" and said first device is in its "1" representing condition and when the digits of said corresponding orders are both "0" and said first device is in its "0" representing condition and operable to otherwise cause said second device to assume its "0" representing condition; input means connected to said first device for receiving said signals representative of the digits of corresponding orders of said operands and operable to cause said first device to assume its "0" representing condition when said digits are both "0" and to cause said first device to assume its "1" representing condition when said digits are both "1," said first device otherwise remaining in its previous information representing condition; and input means connected to said third device for receiving signals indicative of the information representing conditions of said first and second devices and operable to cause said third device to assume a "0" representing condition when said first and second devices are in opposite information representing conditions and operable to cause said third device to assume its "1" representing condition when said first and second devices are in a similar information representing condition.

2. A system for adding a pair of multiple order binary operands, successive orders being represented by set and reset operand signals which occur in coincidence with corresponding successive clock pulses, comprising: first, second and third binary information representing devices each having set and reset input terminals and set and reset output terminals, each operable to assume a reset state upon receipt of a signal at its reset input terminal and operable to assume a set state upon receipt of a signal at its set input terminal, each further operable to produce an arming signal at its reset output terminal and a disarming signal at its set output terminal when in its reset state and a disarming signal at its reset output terminal and an arming signal at its set output terminal when in its set state; a first AND gate connected to the reset input terminal of said first device, said gate having first and second input terminals for receiving reset operand signals and a third input terminal for receiving clock pulses; a second AND gate connected to the set terminal of said first device, said gate having first and second input terminals for receiving set operand signals and a third input terminal for receiving clock pulses; a third AND gate having first and second terminals for receiving set operand signals and a third terminal connected to the set output terminal of said first device; a fourth AND gate having first and second input terminals for receiving reset operand signals and a third input terminal connected to the reset output terminal of said first device; means connecting said third and fourth AND gates to the set input terminal of said second device and operable to apply a set signal to said second device upon the occurrence of a clock pulse when said set operand signals and the signal at said set terminal of said first device are at an arming level and when said reset operand signals and the signal at said reset terminal of said first device are at an arming level; means connecting said third and fourth AND gates to the reset input terminal of said second device and operable to apply a reset signal to said second device upon the occurrence of a clock pulse when at least one of the set operand signals and the signal at said set terminal of said first device is at a disarming level and when at least one of the reset operand signals and the signal at said reset terminal of said first device is at a disarming level; a fifth AND gate having a first input terminal connected to said set output terminal of said first device, a second input terminal connected to the set output terminal of said second device and a third input terminal for receiving clock pulses; a sixth AND gate having a first input terminal connected to said reset output terminal of said first device, a second input terminal connected to the rest output terminal of said second device and a third input terminal for receiving clock pulses; means connecting said fifth and sixth AND gates to the set input terminal of said third device; a seventh AND gate having a first input terminal connected to said set output terminal of said first device, a second input terminal connected to the reset output terminal of said second device and a third input terminal for receiving clock pulses; an eighth AND gate having a first input terminal connected to said reset output terminal of said first device, a second input terminal connected to said set output terminal of said second device and a third input terminal for receiving clock pulses; and means connecting said seventh and eighth AND gates to the reset input terminal of said third device.

3. A system for adding a pair of binary operands the digits of successive orders being represented by operand signals which occur during corresponding successive time intervals, comprising: a first circuit for receiving said operand signals during each tmie interval and operable to produce during the next time interval a "1" representing signal when the digits of corresponding orders of said operands are both "1" and a "0" representing signal when the digits of corresponding orders of said operands are both "0," said first circuit otherwise repeating its previous digit representing signal; a second circuit for receiving said operand signals and signals from said first circuit during each time interval and operable to produce during the next time interval a "1" representing signal in response to a "1" representing signal from said first device and simultaneous "1" representing operand signals and in response to a "0" representing signal from said first device and simultaneous "0" representing operand signals, said second device otherwise producing a "0" representing signal; a third circuit for receiving signals from said first and second circuits during each time interval and operable to produce during the next time interval a "1" representing signal when the signals from said first and second circuits represent like values and a "0" representing signal when the signals from said first and second circuits represent unlike values.

4. In a system providing first and second alternately occurring phases of clock pulses, apparatus for adding a pair of multiple order binary operands, successive orders of said operands being represented by set and reset signals, said set signals normally being at a disarming level and said reset signals normally being at an arming level, a binary "1" being represented by complementary arming and disarming pulses of said set and reset signals respectively in coincidence with pulses of said first phase of clock pulses, comprising: means for producing delayed set and reset pulses of said operand set and reset signals in coincidence with pulses of said second phase of clock pulses; first, second and third monostable devices each having a stable and an astable state of operation; means for triggering said first device to its astable state in response to the arming level of said reset signals in coincidence with pulses of said first phase of clock pulses; means for triggering said first device in response to delayed arming pulses of said operand set signals in coincidence with pulses of said second phase of clock pulses; means for preventing said first device from being triggered more frequently than the occurrence of alternate clock pulses; means providing first device set and delayed set output signals, normally at a disarming level and operable upon the triggering of said first device for producing an arming pulse of said first device set signal in coincidence with the first following clock pulse and for producing an arming pulse of said delayed first device set signal in coincidence with the second following clock pulse; means providing first device reset and delayed reset output signals, normally at an arming level and operable upon the triggering of said first device for producing a disarming pulse of said first device reset signal in coincidence with the first following clock pulse and for producing a disarming pulse of said delayed first device reset signal in coincidence with the second following clock pulse; means for triggering said second device to its astable state in response to the simultaneous occurrence of arming pulses of said delayed operand and first device set signals and in response to the simultaneous occurrence of arming levels of said delayed operand and first device reset signals in coincidence with a pulse of said second phase of clock pulses; means providing second device set and delayed set output signals, normally at a disarming level and operable upon the triggering of said second device for producing an arming pulse of said second device set signal in coincidence with the first following clock pulse and for producing an arming pulse of said delayed second device set signal in coincidence with the second following clock pulse; means providing second device reset and delayed reset output signals, normally at an arming level and operable upon the triggering of said second device for producing a disarming pulse of said second device reset signal in coincidence with the first following clock pulse and for producing a disarming pulse of said delayed second device reset signal in coincidence with the second following clock pulse; means for triggering said third device to its astable state upon the occurrence of pulses of said first phase of clock pulses in response to the simultaneous occurrence of an arming pulse of said first device set signal and an arming level of said second device reset signal and in response to the simultaneous occurrence of an arming level of said first device reset signal and an arming pulse of said second device set signal, and upon the occurrence of pulses of said second phase of clock pulses in response to simultaneous occurrence of arming pulses of said first and second device delayed set signals and in response to simultaneous occurrence of arming levels of said first and second device delayed reset signals, means for preventing said third device from being triggered more frequently than the occurrence of alternate clock pulses; and means operable upon the triggering of said third device for providing a third device output signal.

5. A system for adding a pair of binary operands, comprising: first and second devices each capable of producing signals representative of the binary digits "0" and "1"; an input logic circuit connected to said first device for receiving signals representative of the digits of corresponding orders of said operands and operable to cause said first device to produce a "0" representing carry signal when said operand digits are both "0" and operable to cause said first device to produce a "1" representing carry signal when said operand digits are both "1" and operable to repeat the carry signal of the previous order when said operand digits are unlike in value; an input logic circuit connected to said second device for receiving signals representative of the digits of corresponding orders of said operands and carry signals from said first device and operable to cause said second device to produce a "1" representing intermediate signal when said operand signals and the carry signal represent like values and for otherwise producing a "0" representing intermediate signal; means for receiving carry signals from said first device and intermediate signals from said second device and responsive thereto for producing a "1" representing sum signal when said carry and intermediate signals represent like values and for producing a "0" representing sum signal when said carry and intermediate signals represent unlike values.

6. A system for adding a pair of multiple order binary operands, the value of the digits of successive orders of said operands being represented by operand signals occurring during successive time intervals, comprising: a first circuit for sensing said operand signals during a given time interval and for producing a "0" representing carry signal during the next successive time interval when the corresponding operand digits are both "0," for producing a "1" representing carry signal during the next successive time interval when the corresponding operand digits are both "1," and for producing a carry signal during the next successive time interval representing the value of the carry during the given time interval when said operand digits are of unlike value; a second circuit for sensing said operand signals and carry signals from said first circuit for producing a "1" representing intermediate signal duirng the next successive time interval when the operand digits and the carry digit of said given time interval are of equal value and for otherwise producing a "0" representing intermediate signal during said next successive time interval; and a third circuit for sensing said carry and intermediate signals for producing a '1" representing sum signal when said carry and intermediate signals are of like value and for producing a "0" representing sum signal when said carry and intermediate signals are of unlike value.

7. A system for adding a pair of binary operands, comprising: means for receiving signals representative of the digits of corresponding orders of said operands and operable to produce a "0" representing carry signal when said operand digits are both "0," a "1" representing carry signal when said operand digits are both "1," and to repeat the carry signal of the previous order when said operand digits are unlike in value; means for receiving said signals representative of the digits of corresponding orders of said operands and said carry signals and operable to produce a "1" representing intermediate signal when said operand signals and said carry signals represent like values and for otherwise producing a "0" representing intermediate signal; means for receiving said carry signals and said intermediate signals and responsive thereto for producing a "1" representing sum signal when the carry and intermediate signals represent like values and for producing a "0" representing sum signal when the carry and intermediate signals represent unlike values.

8. A system for subtracting a pair of binary operands the digits of successive orders being represented by operand signals occurring during corresponding successive time intervals, comprising: a first circuit for receiving said operand signals during each time interval and operable to produce during the next time interval a "1" representing borrow signal in response to a "0" representing minuend signal and a "1" representing subtrahend signal, a "0" representing borrow signal in response to a "1" representing minuend signal and a "0" representing subtrahend signal, and otherwise operable to repeat the borrow representing signal of the previous time interval; a second circuit for receiving said operand signals and signals from said first circuit during each time interval and operable to produce during the next time interval a "1" representing intermediate signal in response to a "0" representing minuend signal and "1" representing subtrahend and borrow signals and in repsonse to a "1" representing minuend signal and "0" representing subtrahend and borrow signals, and otherwise operable to produce a "0" representing intermediate signal; and a third circuit for receiving signals from said first and second circuits during each time interval and operable to produce duirng the next time interval a "1" representing difference signal in response to a "0" representing borrow signal and a "1" representing intermediate signal and in response to a "1" representing borrow signal and a "0" representing intermediate signal, and operable to produce a "0" representing difference signal in response to "1" representing borrow and intermediate signals and in response to "0" representing borrow and intermediate signals.

9. A system for subtracting a binary subtrahend from a binary minuend comprising: means for receiving signals representative of the digits of corresponding orders of said subtrahend and minuend and operable to produce a "1" representing borrow signal in response to a "0" representing minuend signal and a "1" representing subtrahend signal, a "0" representing borrow signal in response to a "1" representing minuend signal and a "0" representing subtrahend signal, and otherwise operable to repeat the borrow representing signal of the previous order; means for receiving said signals representative of said subtrahend and minuend digits and said borrow signals and operable to produce a "1" representing intermediate signal in response to a "0" representing minuend signal and "1" representing subtrahend and borrow signals and in response to a "1" representing minuend signal and "0" representing subtrahend and borrow signals, said means being otherwise operable to produce a "0" representing intermediate signal; and means for receiving said borrow and intermediate signals and operable to produce a "1" representing difference signal in response to a "0" representing borrow signal and a "1" representing intermediate signal and in response to a "1" representing borrow signal and a "0" representing intermediate signal, and operable to produce a "0" representing difference signal in response to "1" representing borrow and intermediate signals and in response to "0" representing borrow and intermediate signals.

10. A system for combining a pair of multiple order binary operand members to produce a multiple order binary result number differing from one of said operand numbers by the other of said operand numbers, the digits of successive orders of said operand numbers being represented by operand signals which occur during corresponding successive time intervals, comprising: a first circuit for receiving during each time interval signals representative of the digits of corresponding orders of said operand numbers and operable to produce a signal representative of a given binary digit in response to a first predetermined relation between said operand signals and operable to produce a signal representative of the other binary digit in response to a second predetermined relation between said operand signals and operable to otherwise repeat the previous digit representing signal; a second circuit for receiving during each time interval signals representative of the digits of corresponding orders of said operand numbers and signals produced by said first circuit, said second circuit being operable to produce a signal representative of a given binary digit in response to either of two predetermined relations among said signals received by said second circuit and operable to produce a signal representative of the other binary digit in the absence of either of said two predetermined relations; and means for receiving signals from said first and second circuits and responsive thereto for producing a corresponding digit of said result number.

11. A system for combining a pair of multiple order binary operand numbers to produce a multiple order binary result number differing from one of said operand numbers by the other of said operand numbers, comprising: a first circuit for receiving signals representative of the digits of corresponding orders of said operand numbers and operable to assume a first state in response to a first predetermined relation between said signals and a second state in response to a second predetermined relation between said signals and operable to otherwise remain in its previous state; a second circuit for receiving said signals representative of the digits of corresponding orders of said operand numbers and signals representative of the state of said first circuit and operable to assume a first state in response to either of two predetermined relations among said signals and to assume a second state in the absence of either of said two predetermined relations; and means for receiving signals representative of the states of said first and second circuits and responsive thereto for producing a corresponding digit of said result number.

References Cited in the file of this patent

UNITED STATES PATENTS 2,998,918 Ferris ------------------ Sept. 5, 1961